(12) United States Patent
Gehringhoff et al.

(10) Patent No.: US 6,619,725 B2
(45) Date of Patent: Sep. 16, 2003

(54) SIDE IMPACT STRUCTURE, AND DOOR WITH INTEGRATED SIDE IMPACT STRUCTURE

(75) Inventors: Ludger Gehringhoff, Paderborn (DE); Stefan Gossmann, Bad Wünnenberg (DE)

(73) Assignee: Benteler Automobiltechnik GmbH & Co. KG, Paderborn (DE)

( * ) Notice: Subject to any disclaimer, the term of this patent is extended or adjusted under 35 U.S.C. 154(b) by 0 days.

(21) Appl. No.: 10/131,619

(22) Filed: Apr. 23, 2002

(65) Prior Publication Data

US 2002/0158487 A1 Oct. 31, 2002

(30) Foreign Application Priority Data

Apr. 27, 2001 (DE) .......................................... 101 20 935

(51) Int. Cl.[7] .................................................. B60J 5/04
(52) U.S. Cl. ................................ 296/146.6; 296/146.9; 49/503; 70/418
(58) Field of Search ........................ 296/146.6, 146.5, 296/146.9, 188; 49/502, 503; 70/418; 292/346, DIG. 2

(56) References Cited

U.S. PATENT DOCUMENTS

| | | | | |
|---|---|---|---|---|
| 3,964,208 A | * | 6/1976 | Renner et al. ................. 49/502 |
| 4,328,642 A | * | 5/1982 | Presto ........................... 49/502 |
| 4,411,466 A | * | 10/1983 | Koike ....................... 296/146.6 |
| 4,628,300 A | * | 12/1986 | Amato ......................... 180/287 |
| 5,308,129 A | * | 5/1994 | Hlavaty ......................... 24/701 |
| 5,417,470 A | * | 5/1995 | Holt .......................... 296/146.6 |
| 5,536,060 A | * | 7/1996 | Rashid et al. ............. 296/146.5 |
| 5,544,930 A | * | 8/1996 | Stedman ................... 296/146.6 |
| 5,553,910 A | * | 9/1996 | Park ......................... 296/146.6 |
| 5,595,415 A | * | 1/1997 | Beaulat ....................... 296/39.1 |
| 5,676,002 A | * | 10/1997 | Hoeptner, III .............. 292/346 |
| 5,813,719 A | * | 9/1998 | Kowalski ................. 296/146.6 |
| 5,857,732 A | * | 1/1999 | Ritchie .................... 296/146.11 |
| 5,868,456 A | * | 2/1999 | Kowalski et al. ......... 296/146.6 |
| 6,039,387 A | * | 3/2000 | Choi ....................... 296/146.6 |

FOREIGN PATENT DOCUMENTS

| | | |
|---|---|---|
| DE | 296 22 985 U1 | 11/1997 |
| EP | 0 662 053 B1 | 7/1995 |
| EP | 0 728 602 A1 | 8/1996 |
| JP | 6-80022 A * | 3/1994 ............... 296/146.5 |

* cited by examiner

Primary Examiner—D. Glenn Dayoan
Assistant Examiner—Patricia Engle
(74) Attorney, Agent, or Firm—Henry M. Feiereisen

(57) ABSTRACT

A side impact structure for incorporation between an outer shell and an inner door panel of a door of a motor vehicle, includes an elongate section member having an attachment element. Secured to the attachment element is a blocking element which at least partially bridges a spacing between the outer shell and the inner door panel to thereby prevent access to the actuating mechanism of the door lock via a gap in the outer shell.

5 Claims, 1 Drawing Sheet

SIDE IMPACT STRUCTURE, AND DOOR WITH INTEGRATED SIDE IMPACT STRUCTURE

CROSS-REFERENCES TO RELATED APPLICATIONS

This application claims the priority of German Patent Application Ser. No. 101 20 935.5, filed Apr. 27, 2001, pursuant to 35 U.S.C. 119(a)–(d), the subject matter of which is incorporated herein by reference.

BACKGROUND OF THE INVENTION

The present invention relates, in general, to a side impact structure as reinforcement for a vehicle door of a motor vehicle. The present invention further relates to a vehicle door having integrated therein a side impact structure.

Side impact structures are provided for protecting vehicle occupants from injury in the event of a collision from the side and are typically used as door reinforcement. Depending on the stability of the basic configuration of the door, the side impact structure should have high rigidity in a direction transversely to the traveling direction.

There are many designs known in the art to implement side impact protective devices. For example, European Pat. No. EP 0 728 602 A2 describes a side impact structure in the form of a tube construction as well as in the form of a folded construction with trapezoidal end portions which are flat and widened. European Pat. No. EP 0 662 053 describes a side impact structure which is provided with a cap-shaped cross section over a major part of its length and has end portions which flatten toward the end faces and increase in width.

German Pat. No. DE 296 22 985 U1 describes a side impact structure which has one flat end with a tab being bent upwards therefrom. The tab forms a hook and projects into one of the door columns of the vehicle chassis, when the door is closed. The hook is intended to provide a second form-fitting connection, in addition to the door lock, and to provide an additional protection in the event of a collision from the side.

The installation of side impact structures into the vehicle door is typically realized by using weld-on sheet metal brackets or screw fasteners as desired breaking points so as to shear off in the event of a head-on collision. In this way, wedging of the side impact structure in the vehicle door should be avoided after a head-on crash.

Motor vehicles are oftentimes the object of break-in or theft. Known devices for unauthorized opening of a vehicle door include tampering tools which are inserted through existing gaps in the outer shell of the door, e.g., the clip holes for attachment of a decorative strip, in order to reach the actuating mechanism for the door lock and to ultimately open the door. As a result of such acts, the owner of the vehicle oftentimes has to cope with financial losses and to spend a great time to deal with authorities and insurances.

It would therefore be desirable and advantageous to provide an improved side impact structure to obviate prior art shortcomings and to at least significantly inhibit an unauthorized tampering with the door lock via gaps in the outer shell of the vehicle door.

SUMMARY OF THE INVENTION

According to one aspect of the present invention, a side impact structure for incorporation between an outer shell and an inner door panel of a door of a motor vehicle, includes an elongate section member having an attachment element, and a blocking element secured to the attachment element and at least partially bridging a spacing between the outer shell and the inner door panel.

The present invention resolves prior art problems by placing the attachment element suitably in the area of the B column, i.e. in the area adjacent the door lock, and by providing a blocking element which projects out transversely from the attachment element to at least partially bridge the distance between the outer shell of the door and the inner door panel. The blocking element can be integrated in single-piece configuration with the side impact structure and prevents access to the actuating mechanism of the door lock. In this way, an unauthorized and unlawful opening of the vehicle door from outside through a gap in the outer shell is prevented or at least so delayed as to thwart the unlawful act because speed is of the essence in these situations. Persons with intentions to engage in such unlawful acts will be deterred in the future to tamper with vehicles of this type equipped with a side impact structure according to the present invention. Thus, the present invention provides a further contribution to the safety aspect of a motor vehicle against break-in and/or theft.

According to another feature of the present invention, the spacing between the outer shell and the inner door panel is bridged by the blocking element by more than half of its extension. In this way, access by a tampering tool inserted through a gap in the outer shell of the door to reach the actuating mechanism of the door lock becomes almost impossible. Optionally, the end of the projecting blocking element may be provided with supplementing measures, such as edges or folds to further complicate the tampering act.

According to another feature of the present invention, the blocking element is configured in the form of a hook-shaped shield. This configuration is effective to defend against unlawful manipulations and, moreover, is easy to manufacture. Also the installation of the side impact structure in the vehicle door does not require any modification to conventional manufacturing techniques. Suitably, the shield is connected to an upper free end of the attachment element.

According to another aspect of the present invention, a vehicle door for a motor vehicle, includes an outer shell, an inner door panel, an actuating mechanism for operating a door lock, and a side impact structure disposed between the outer shell and the inner door panel, with the side impact structure having an attachment element for securement to a B column of the motor vehicle, and a blocking element connected to the attachment element for inhibiting access to the actuating mechanism.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 2:
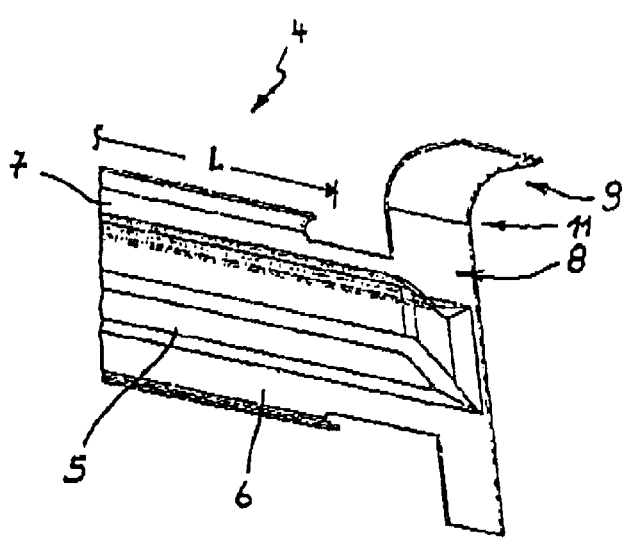
FIG. 2 is a perspective illustration of one end of a side impact structure according to the present invention for connection to the B column.

Throughout all the Figures, same or corresponding elements are generally indicated by same reference numerals.

Figure 1:
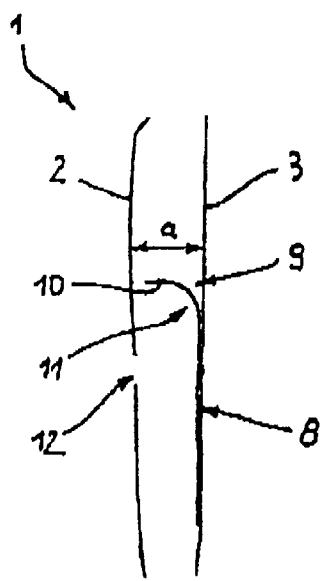
FIG. 1 is a schematic vertical sectional view of a vehicle door in the area of the B column and having incorporated therein the side impact structure according to the present invention.

Turning now to the drawing, and in particular to FIG. 1, there is shown a schematic vertical sectional view of a vehicle door 1 in the area of the B column of a chassis of a motor vehicle. The door 1 includes an outer shell 2, which is slightly arched outwards in longitudinal direction of the vehicle, and an inner door panel 3, which extends at a horizontal distance "a" to the outer shell 2. Incorporated in the door 1 between the outer shell 2 and the inner door panel 3 is a side impact structure according to the present invention, generally designated by reference numeral 4 and shown in more detail in FIG. 2.

As shown in FIG. 2, the side impact structure 4 includes over a central length portion L a cap-shaped elongate section member 5 with two lateral leg portions 6, 7. The section member 5 is formed in one piece with attachment elements, of which only attachment element 8 on the B column side is illustrated. Connected to the attachment element 8 is a blocking element, generally designated by reference numeral 9 and including a hook-shaped shield 10 which is formed at the upper free end 11 of the attachment element 8. The shield 10 projects out from the attachment element 8 in transverse direction to bridge the distance "a" between the outer shell 2 and the inner door panel 3 by more than half of its extension. In this way, the, not shown, actuating mechanism for the door lock, not shown, is effectively guarded against unlawful manipulation by a tampering tool, e.g. a wire, inserted through a gap 12 in the outer shell 2. The gap 12 may, e.g., be a clip hole for attachment of a decorative strip upon the outer shell 2 of the door 1.

The provision of the blocking element 9 so interferes with a tampering action as to effectively prevent or at least sufficiently delay a successful undertaking so that unlawful acts and unauthorized opening of the door 1 are effectively thwarted.

While the invention has been illustrated and described as embodied in a side impact structure, and door with integrated side impact structure, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A side impact structure for incorporation between an outer shell and an inner door panel of a door of a motor vehicle, comprising:
   an elongate section member having an attachment element for connection to the inner door panel; and
   a blocking element secured to the attachment element and at least partially bridging a spacing between the outer shell and the inner door panel, wherein the blocking element is a hook-shaped shield which is connected to an upper free end of the attachment element.

2. The side impact structure of claim 1, wherein the spacing between the outer shell and the inner door panel is bridged by the blocking element by more than half of its extension.

3. A vehicle door for a motor vehicle, comprising:
   an outer shell;
   an inner door panel;
   an actuating mechanism for operating a door lock; and
   a side impact structure disposed between the outer shell and the inner door panel, said side impact structure having an attachment element in an area of a B column of the motor vehicle, and a blocking element connected to the attachment element for inhibiting access to the actuating mechanism, wherein the blocking element is a hook-shaped shield which is connected to an upper free end of the attachment element.

4. The door of claim 3, wherein the blocking element is so configured as to at least partially bridge a spacing between the outer shell and the inner door panel.

5. The door of claim 4, wherein the spacing between the outer shell and the inner door panel is bridged by the blocking element by more than half of its extension.

\* \* \* \* \*